(12) United States Patent
Steinlechner

(10) Patent No.: US 7,694,562 B2
(45) Date of Patent: Apr. 13, 2010

(54) METHOD AND CIRCUIT ARRANGEMENT FOR SECURE START-UP OF A RATE-OF-TURN SENSOR

(75) Inventor: Siegbert Steinlechner, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 172 days.

(21) Appl. No.: 11/577,740

(22) PCT Filed: Jun. 14, 2006

(86) PCT No.: PCT/EP2006/063188

§ 371 (c)(1),
(2), (4) Date: Apr. 23, 2007

(87) PCT Pub. No.: WO2007/012521

PCT Pub. Date: Feb. 1, 2007

(65) Prior Publication Data
US 2009/0114015 A1 May 7, 2009

(30) Foreign Application Priority Data
Jul. 26, 2005 (DE) ........................ 10 2005 034 702

(51) Int. Cl.
*G01C 19/56* (2006.01)
(52) U.S. Cl. .................................. 73/504.12
(58) Field of Classification Search .............. 73/504.12, 73/504.04, 504.02, 504.13, 504.14, 504.15
See application file for complete search history.

(56) References Cited

U.S. PATENT DOCUMENTS 4,814,680 A * 3/1989 Hulsing ....................... 318/561
7,249,488 B2 * 7/2007 Schroeder ................... 73/1.77
2004/0123660 A1 7/2004 Willig et al.
2006/0071578 A1 4/2006 Drabe et al.

FOREIGN PATENT DOCUMENTS

| DE | 102 37 411 | 7/2003 |
|----|------------|--------|
| DE | 102 37 410 | 8/2003 |
| DE | 102 40 087 | 3/2004 |
| EP | 1 437 569 | 7/2004 |
| JP | 09049736 | 2/1997 |
| WO | 2004/092745 | 10/2004 |

* cited by examiner

*Primary Examiner*—Helen C. Kwok
(74) *Attorney, Agent, or Firm*—Michael J. Striker

(57) ABSTRACT

For operational control of a start-up of a rate-of-turn sensor including at least one oscillator element that is excitable to perform a mechanical oscillating motion, a signal proportional to the instantaneous speed or deflection of the oscillator element is amplified and used as the operating signal to operate the oscillator element, during the start-up process for the rate-of-turn sensor, the amplitude of the operating signal is set to a constant specifiable value, the stimulation frequency of the operating signal is increased essentially continuously from a starting value below the main driving frequency of the oscillating motion to a final value above the main driving frequency and below a spurious driving frequency while, simultaneously, the deflection and/or the speed of the oscillator element are monitored in order to determine the main driving frequency of the oscillating motion, once the final value is reached and the main driving frequency is determined, the stimulation frequency of the operating signal is set to the main driving frequency, and the operational regulation of the amplitude and the stimulation frequency of the operating signal are released.

18 Claims, 1 Drawing Sheet

METHOD AND CIRCUIT ARRANGEMENT FOR SECURE START-UP OF A RATE-OF-TURN SENSOR

CROSS-REFERENCE TO RELATED APPLICATION

The invention described and claimed hereinbelow is also described in German Patent Application DE10 2005 034 702.9 filed on Jul. 26, 2005. This German Patent Application, whose subject matter is incorporated here by reference, provides the basis for a claim of priority of invention under 35 U.S.C. 119(a)-(d).

BACKGROUND OF THE INVENTION

The present invention relates to a method for starting up a rate-of-turn sensor, and a circuit arrangement for carrying out the method.

Micromechanical rate-of-turn sensors are used, e.g., in motor vehicles for the functionality of the electronic stability program, ESP, or for roll-tendency compensation. They use the Coriolis effect to measure, e.g., the rate-of-turn around the vertical axis or longitudinal axis of the motor vehicle.

The description below pertains only to the driving circle that occurs in rate-of-turn sensors of this type, without the measuring circle for determining the Coriolis acceleration.

Micromechanical rate-of-turn sensors contain one or more mechanical oscillators, each of which includes an elastically suspended oscillator element. The mechanical oscillators can be stimulated to perform a periodic oscillating motion using driving forces that change periodically with time and are applied electrostatically.

Rate-of-turn sensors are known, e.g., from DE 102 37 410 A1 and DE 102 37 411 A1.

Rate-of-turn sensors are operated at a mechanical driving frequency of the oscillator element. To this end, a suitable stimulation frequency of a drive signal F(t) that generates the driving forces must be selected. At the driving frequency, a phase shift does not occur between the speed of the oscillator element and the stimulation frequency of the drive signal F(t), and the phase shift between the deflection of the oscillator element and the stimulation frequency of the drive signal F(t) is $-\pi/2$. Ideally, the shape of the graph of the drive signal F(t) that generates the driving forces is sinusoidal. The term "sinusoidal" also refers to a graph with a cosinusoidal shape, i.e., a sinusoidal curve shifted by $\pi/2$. A square-wave drive signal F(t) that is easy to generate is usually used in practical application, however.

The instantaneous deflection or the instantaneous speed of the oscillator element is measured using capacitive sensors located on the oscillator element, and a signal x(t) proportional to the instantaneous deflection, or a signal v(t) proportional to the instantaneous speed is output. When the signal v(t) proportional to the speed is amplified in a suitable manner, the resultant signal can be used once more—either directly or after squaring—as a drive signal F(t) for generating the driving force. If deflection is measured instead of speed, the phase shift of $-\pi/2$ must first be compensated, e.g., using an additional phase modifier, before it is coupled with the drive signal F(t).

In both cases, the mechanical oscillator begins to oscillate with a driving frequency when sufficiently amplified. To ensure that the oscillation amplitude does not become too great, and to prevent damage to the oscillator element, the oscillation amplitude must be measured and regulated to a specified value by changing the amplitude $A_F$ of the drive signal F(t).

Since a mechanical oscillator can have higher-frequency, spurious driving frequencies in addition to its main mechanical driving frequency, cases arise in which the arrangement described above does not oscillate at the main driving frequency, but rather at a spurious driving frequency. This is a serious problem, because the functionality of the rate-of-turn sensor becomes unavailable as a result.

This effect can occur in particular when the drive signal F(t) is square-wave. Since x(t) or v(t) are sinusoidal signals, they are typically forwarded to a comparator, which compares the signals with zero and outputs a square-wave output signal F(t). With small input signals x(t) or v(t), the amplification of a comparator of this type reaches very high values, i.e., of a magnitude greater than $10^5$. As a result, it is also possible to stimulate very weak spurious resonances in the oscillation motion of the oscillator element to become unwanted, stable oscillations.

In practical application, methods are used in some cases with which the signals x(t) or v(t) are not coupled directly with the drive signal F(t). Systems of this type function in a manner similar to a phase locked loop, PLL. An example of a system of this type is shown in FIG. 1, framed by a dashed line. In this case as well, the system can lock into a spurious resonance if it is not dimensioned properly and/or if it is not monitored.

SUMMARY OF THE INVENTION

The disadvantages of the related art are prevented with an inventive method of the species described initially by influencing the operational control of the rate-of-turn sensor during the start-up process such that it is suppressed, and the amplitude of the drive signal is set at a constant, pre-settable value that is not damaging to the rate-of-turn sensor; the stimulation frequency of the drive signal is increased continually from a starting value below the main driving frequency of the mechanical oscillation motion to an end value above the main driving frequency and below a spurious driving frequency, while simultaneously monitoring the deflection and/or speed of the oscillation motion of the oscillator element in order to determine the main driving frequency of the oscillation motion while the stimulation frequency is being increased; once the end value is reached and after the main driving frequency is determined, the stimulation frequency of the drive signal is set to the main driving frequency, and the operational control of the amplitude and the stimulation frequency of the drive signal is released for normal operation of the rate-of-turn sensor.

The inventive method has the advantage over the related art that the rate-of-turn sensor is prevented from locking into a spurious driving frequency. The inventive method ensures that the rate-of-turn sensor oscillates at its main driving frequency during the start-up process.

According to an advantageous embodiment, the inventive method and the associated circuit arrangement recognizes when the main driving frequency has been passed out of, and thereby initiates a process once more of locking the stimulation frequency into the main driving frequency. Secure operation of the rate-of-turn sensor is thereby made possible even in the presence of external electrical or mechanical disturbances. The present invention therefore ensures that a rate-of-turn sensor reliably locks into its main driving frequency once more after an electrical or mechanical disturbance has taken place.

The start-up process is restarted when the amplitude of the drive signal exceeds a specified maximum value. This is precisely the case when the stimulation frequency of the drive signal has become distanced from the main driving frequency of the oscillation motion of the oscillator element, because an amplitude regulator that is responsible for regulating the amplitude of the drive signal attempts to compensate the inadequate amplitude of the deflection or the speed of the oscillator element that results when the main driving frequency has been left by increasing the amplitude of the drive signal.

As an alternative, it is possible to monitor the stimulation frequency of the drive signal directly instead of the amplitude of the drive signal. The start-up process can be re-initiated, e.g., when the driving frequency exceeds or falls below the limits—by a pre-settable value—specified by the starting values and end values of the raising of the stimulation frequency during the start-up process.

It is also feasible that the main driving frequency determined during the start-up process of the rate-of-turn sensor is stored for the interim, so that, e.g., the start-up process can be restarted if the stimulation frequency deviates from the intermediately stored main driving frequency by a pre-settable value, or, when the main driving frequency has been passed out of, to set the stimulation frequency to the main driving frequency that was determined during the first start-up process, without restarting the start-up process.

According to an advantageous embodiment of the present invention, the start-up process is restarted when the amplitude of the drive signal exceeds a pre-settable maximum value for longer than a pre-settable period of time, or the stimulation frequency of the drive signal deviates from the intermediately-stored main driving frequency for longer than a pre-settable period of time, or it approaches the limits specified by the starting values and end values—except for a pre-settable value—of the raising of the driving frequency during the start-up process for longer than a pre-settable period of time.

The supply voltage of the rate-of-turn sensor is preferably monitored continually, and the start-up process is restarted when the supply voltage falls below a certain, pre-settable value.

It is also feasible, in principle, that the signal proportional to the oscillation motion is not amplified directly, but is used instead to generate a drive signal, the amplitude and stimulation frequency of which can be regulated; at start-up, the stimulation frequency and the amplification of the amplitude of the drive signal are influenced.

A combination of monitoring the amplitude and the stimulation frequency of the drive signal is also feasible.

DESCRIPTION OF THE PREFERRED EMBODIMENTS

Figure 1:
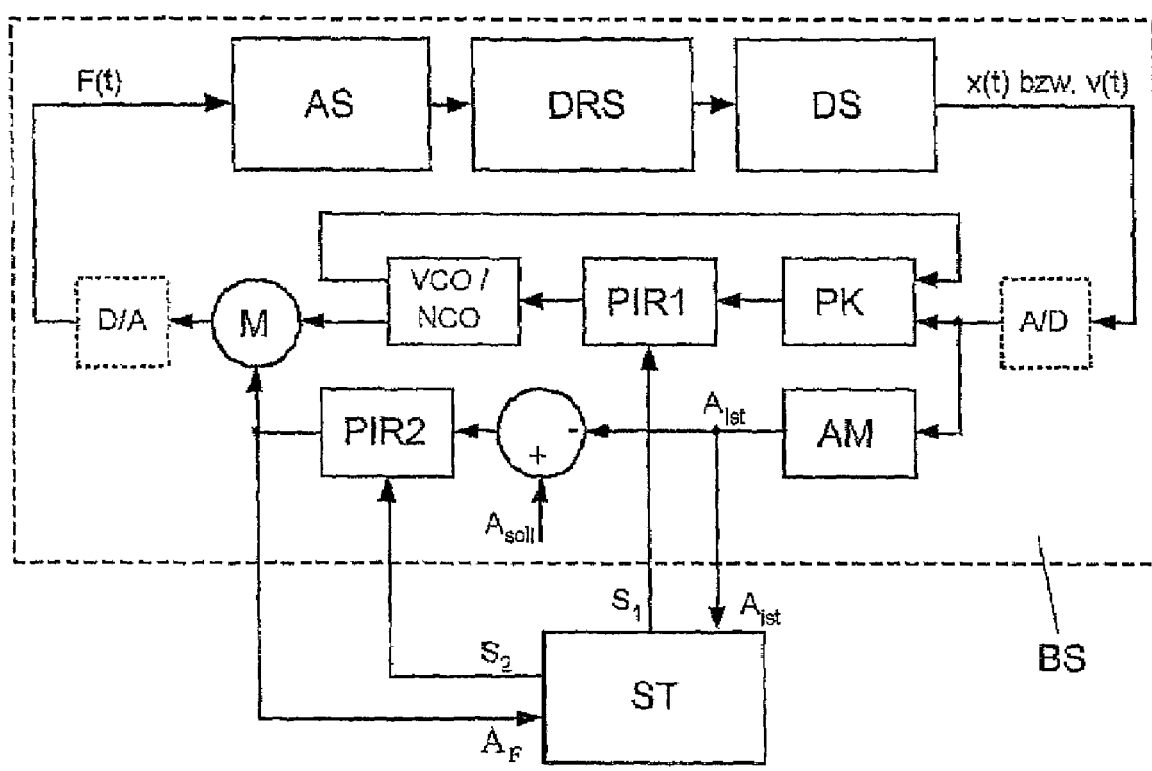
FIG. 1 of the drawings is a view showing a circuit arrangement for secure start-up of a rate-of-turn sensor in accordance with the present invention.

An inventive circuit arrangement for secure start-up of a rate-of-turn sensor DRS is depicted in FIG. 1. An operating circuit BS framed with a dashed line serves to drive the rate-of-turn sensor DRS that includes at least one oscillator element that is excitable to perform an oscillating motion using a periodic drive signal F(t).

Drive signal F(t) for the oscillator element of the rate-of-turn sensor DRS is converted by a drive circuit AS to a driving force that is proportional to drive signal F(t). The deflection or speed of the oscillation motion of the oscillator element is sensed by a detection circuit DS and converted to electrical signals x(t), v(t) that are proportional to the deflection or the speed. Detection circuit DS includes, e.g., capacitive sensors. The remainder of operating circuit BS can be analog or, preferably, digital in design. When the design is digital, analog-digital converters A/D and digital-analog converters D/A—depicted using dashed lines—are needed for signal conversion.

An analog voltage controlled oscillator, VCO, or a digital numerical controlled oscillator, NCO, generates a sinusoidal oscillation that drives the oscillator element of rate-of-turn sensor DRS using a multiplier M that serves to regulate the amplitude. Output signal x(t) or v(t) of detection circuit DS is compared in a phase comparator PK with a target phase signal from the VCO/NCO. This takes place by the output signal of phase comparator PK outputting zero when the oscillator element of rate-of-turn sensor DRS oscillates in resonance. At driving frequency, there is no phase shift between signal v(t) proportional to the speed of the oscillation motion and drive signal F(t), but the phase shift is $-\pi/2$ between signal x(t) proportional to the deflection of the oscillation motion and drive signal F(t).

The output signal of phase comparator PK is connected with the input of a regulator PIR1, which is preferably designed as a proportional integral regulator. The regulator output influences the frequency output by VCO/NCO, which is therefore adjusted such that the output of phase comparator PK becomes zero, i.e., a driving frequency is attained.

In a parallel branch, amplitude $A_{ist}$ of x(t) or v(t) is measured using an amplitude-measuring component AM, and it is compared with an expected value $A_{soll}$. In this case as well, a regulator PIR2—which is preferably designed as a proportional-integral-regulator—ensures that $A_{ist}=A_{soll}$ is maintained by changing amplitude $A_F$ of drive signal F(t).

When rate-of-turn sensor DRS is switched on, a control circuit ST assumes control of the output VCO/NCO frequency and the amplitude of drive signal F(t). To this end, control signals $S_1$ and $S_2$ are preferably impressed dominantly in the integrators of the two regulators PIR1, PIR2. A control of regulators PIR1, PIR2 via their regular inputs is suppressed.

Amplitude $A_F$ of drive signal F(t) is set via control signal $S_2$ to a constant value $A_{Fc}$ that is non-damaging to the rate-of-turn sensor DRS.

At the same time, the frequency of the VCO/NCO, which corresponds to the stimulation frequency of drive signal F(t), is set to a starting frequency $f_1$ using control signal $S_1$. The frequency is then raised continually to a final frequency $f_2$ in a linear or finely stepped manner within a specifiable time interval of, e.g., a few tenths of a second. This process can also be referred to as a frequency scan. The output of amplitude-measuring component AM is monitored using control circuit ST. Control circuit ST stores the value—which corresponds to the driving frequency—of control signal $S_1$, at which the maximum of amplitude $A_{ist}$ of signal v(t), x(t) proportional to the speed or deflection of the oscillator element was observed at a constant amplitude $A_{Fc}$ of the drive signal. After the frequency scan ends, the stored value of control signal $S_1$ is transferred to regulator PIR1 located upstream of the VCO/NCO, and the control is returned to the two regulators PIR1 and PIR2 and, therefore, to operating circuit BS. As a result, the stimulation frequency is already very close to the actual driving frequency of the oscillator element of rate-of-turn sensor DRS; the frequency and amplitude regulations begin to work and, shortly thereafter, they have reliably locked into oscillation.

Start and end frequencies $f_1$ and $f_2$ of the frequency scan are selected such that the main driving frequency of the oscillating motion of the oscillator element is reliably located between these two values, and there is no spurious resonance between start frequency $f_1$ and end frequency $f_2$.

In normal operation, control circuit ST monitors amplitude $A_F$ of drive signal F(t). If rate-of-turn sensor DRS falls out of step due to an interference and is operated outside of its main driving frequency, amplitude regulator PIR2 will attempt to compensate the drop in amplitude $A_{ist}$ using an increasing value of $A_F$. Via the I portion in regulator PIR2, amplitude $A_F$ will continue to rise until it reaches a natural or specified limit. When amplitude $A_F$ is continually located over a selected maximum value $A_{Fmax}$ for longer than a specifiable period of time of, e.g., one second, control circuit ST initiates a resetting of amplitude and frequency, as described with regard for the start-up process. In response, rate-of-turn sensor DRS is brought back to a normal operating state.

INDUSTRIAL APPLICABILITY

The present invention has industrial applicability, in particular, in the field of manufacturing and operating rate-of-turn sensors and operating circuits for sensors of this type. The present invention is suited for the cost-favorable realization of future rate-of-turn sensors for ESP, roll-tendency compensation, and navigation.

What is claimed is:

1. A method for the start-up of a rate-of-turn sensor (DRS) that includes at least one oscillator element that is excitable to perform a mechanical oscillating motion; for an operational control of the rate-of-turn sensor, a signal (v(t), x(t)) proportional to an instantaneous speed or a deflection of the oscillator element is amplified, and the amplified signal is used as an operating signal (F(t)) to operate the oscillator element,
wherein during a start-up process for the rate-of-turn sensor (DRS), an amplitude (AF) of the operating signal (F(t)) is set to a constant specifiable value ($A_{Fc}$); a stimulation frequency of the operating signal (F(t)) is increased essentially continuously from a start value ($f_1$) below the main driving frequency of the oscillating motion to a final value ($f_2$) above a main driving frequency and below a spurious driving frequency while, simultaneously, the deflection (x(t)) and/or the speed (v(t)) of the oscillator element are monitored in order to determine the main driving frequency of the oscillating motion; once the final value ($f_2$) is reached and the main driving frequency is determined, the stimulation frequency of the operating signal (F(t)) is set to the main driving frequency, and an operational regulation of the amplitude ($A_F$) and the stimulation frequency of the operating signal (F(t)) are released.

2. The method as recited in claim 1,
wherein the start-up process is restarted when the amplitude ($A_F$) of the operating signal (F(t)) exceeds a specifiable maximum value ($A_{Fmax}$).

3. The method as recited in claim 2,
wherein the start-up process is restarted when the amplitude ($A_F$) of the operating signal (F(t)) exceeds the specifiable maximum value ($A_{Fmax}$) for a specifiable period of time.

4. The method as recited in claim 1,
wherein the main driving frequency determined during the start-up process of the rate-of-turn sensor (DRS) is stored for the interim.

5. The method as recited in claim 1,
wherein the start-up process is restarted when (an) operating frequency falls below or exceeds the limits specified by the start value ($f_1$) and end value($f_2$) by a specifiable value.

6. The method as recited in claim 5,
wherein the main driving frequency determined during the start-up process of the rate-of-turn sensor (DRS) is stored for the interim.

7. The method as recited in claim 6,
wherein the start-up process is restarted when the stimulation frequency deviates from an intermediately-stored main driving frequency by a specifiable value.

8. The method as recited in claim 1,
wherein the start-up process is restarted when the stimulation frequency of the operating signal (F(t)) deviates from the intermediately-stored main driving frequency by a specifiable period of time, or when the stimulation frequency of the operating signal (F(t)) approaches the limits defined by the start value ($f_1$) and the final value ($f_2$), except for a specifiable value, for a specifiable period of time.

9. The method as recited in claim 1,
wherein a supply voltage of the rate-of turn sensor (DRS) is monitored, and the start-up process is restarted when the supply voltage of the rate-of-turn sensor (DRS) falls below a certain, specifiable value.

10. The method as recited in claim 1,
wherein the signal (v(t), x(t)) proportional to the speed or the deflection is not amplified directly, but is used instead to generate an operating signal (F(t)) that can be regulated in terms of amplitude ($A_F$) and stimulation frequency.

11. A circuit arrangement for carrying out the method as recited in claim 1, that includes an operational control (BS) with means (VCO/NCO, PIR1, PIR2, PK, AM, M) for generating an operating signal (F(t)) to operate an oscillator element, of a rate-of-turn sensor (DRS), that is excitable to perform an oscillating motion based on a signal (v(t), x(t)) proportional to an instantaneous speed or the deflection of the oscillator element, characterized by means for determining a main driving frequency of the oscillating motion of the oscillator element during the start-up process of the rate-of-turn sensor (DRS), and means for transferring the main driving frequency to the operational control (BS) after the start-up process ends.

12. The circuit arrangement as recited in claim 11,
wherein the means for determining the main driving frequency includes means (ST, $S_2$) for generating a constant amplitude ($A_F$) of the operating signal (F(t)), means (ST, $S_1$) for continually increasing a stimulation frequency of the operating signal (F(t)) from a starting value ($f_1$) to an end value ($f_2$), means for simultaneously monitoring the deflection (x(t)) and/or the speed (v(t)) of the oscillator element while the stimulation frequency is being increased, and means for determining the stimulation frequency, at which the deflection (x(t)) and/or speed (v(t)) of the oscillator element have a maximum.

13. The circuit arrangement as recited in claim 11, characterized by means for intermediately storing the main driving frequency determined during the start-up process.

14. The circuit arrangement as recited in claim 12, characterized by means for monitoring the amplitude ($A_F$) of the operating signal (F(t)), means for comparing the amplitude ($A_F$) of the operating signal (F(t)) with a maximum value ($A_{Fmax}$), and means for restarting the start-up process when the amplitude ($A_F$) of the operating signal (F(t)) exceeds the maximum value ($A_{Fmax}$).

15. The circuit arrangement as recited in claim 14, characterized by means for restarting the start-up process when the amplitude ($A_F$) of the operating signal (F(t)) exceeds the maximum value ($A_{Fmax}$) for a specifiable period of time.

16. The circuit arrangement as recited in claim 12, characterized by means for monitoring the stimulation frequency, means for comparing the stimulation frequency with an intermediately-stored main driving frequency or with the starting value ($f_1$) and the end value ($f_2$), and means for restarting the start-up process when the operating frequency deviates from one or more of these frequencies by specifiable values.

17. The circuit arrangement as recited in claim 16, characterized by means for restarting the start-up process when the stimulation frequency of the operating signal (F(t)) deviates from the intermediately-stored main driving frequency for a specifiable period of time, or when the stimulation frequency of the operating signal (F(t)) approaches the limits defined by the starting value ($f_1$) and the end value ($f_2$), except for a specifiable value, for a specifiable period of time.

18. The circuit arrangement as recited in claim 11, characterized by means for monitoring a supply voltage of the rate-of-turn sensor (DRS), and means for restarting the start-up process when the supply voltage deviates by a specifiable value.

* * * * *